US012663093B2

(12) United States Patent　　　(10) Patent No.: US 12,663,093 B2

Takagi　　　　　　　　　　　　　(45) Date of Patent: Jun. 23, 2026

(54) THREE-WAY VALVE

(71) Applicant: Rinnai Corporation, Aichi (JP)

(72) Inventor: Naoto Takagi, Aichi (JP)

(73) Assignee: Rinnai Corporation, Aichi (JP)

( * ) Notice: Subject to any disclaimer, the term of this patent is extended or adjusted under 35 U.S.C. 154(b) by 61 days.

(21) Appl. No.: 18/827,928

(22) Filed: Sep. 9, 2024

(65) Prior Publication Data

US 2025/0277539 A1　　Sep. 4, 2025

(30) Foreign Application Priority Data

Feb. 29, 2024　(JP) ................................. 2024-029557

(51) Int. Cl.
| | |
|---|---|
| *F16K 31/04* | (2006.01) |
| *F16K 11/044* | (2006.01) |
| *F16K 31/06* | (2006.01) |
| *F16K 41/04* | (2006.01) |

(52) U.S. Cl.
CPC .......... *F16K 31/047* (2013.01); *F16K 11/044* (2013.01); *F16K 41/04* (2013.01); *F16K 31/0627* (2013.01); *Y10T 137/86895* (2015.04)

(58) Field of Classification Search
CPC ..... Y10T 137/87788; Y10T 137/86879; F16K 11/044
See application file for complete search history.

(56) References Cited

U.S. PATENT DOCUMENTS

| | | | | |
|---|---|---|---|---|
| 261,224 | A | * | 7/1882 | Groshon ............... F16K 11/044 137/625.5 |
| 303,554 | A | * | 8/1884 | Becker .................. F16K 11/044 137/625.27 |
| 3,329,165 | A | * | 7/1967 | Lang ..................... F16K 27/029 137/625.5 |
| 5,184,773 | A | * | 2/1993 | Everingham ...... B60H 1/00485 137/625.5 |
| 5,364,066 | A | * | 11/1994 | Dorste .................... F25B 41/35 251/210 |
| 8,960,637 | B2 | * | 2/2015 | Parker ..................... F25B 41/35 251/250.5 |

(Continued)

FOREIGN PATENT DOCUMENTS

| | | | |
|---|---|---|---|
| JP | 2011033088 | * | 7/2009 |
| JP | 2014-62559 A | | 4/2014 |

*Primary Examiner* — Robert K Arundale
(74) *Attorney, Agent, or Firm* — Nakanishi IP Associates, LLC

(57) ABSTRACT

To assemble a three-way valve without weakening the bond between a driver and a shaft with grease adhering to the shaft end, a straight flow path includes two ends and an intermediate portion respectively continuous with first to third ports, and first and second valve orifices having opening areas changed when first and second valve elements (34*a*, 34*b*) at the bottom of the shaft (35) move. The shaft extends through a bearing (42) in a guide (41) with its top bonded inside the cylindrical driver (50). The driver includes a gear (51) at the top and an externally threaded portion (53) at the bottom. The guide includes an internally threaded portion (43) above the bearing to receive the externally threaded portion. The driver includes a cylindrical portion (54) protruding downward from the externally threaded portion with its outer diameter smaller than an inner diameter of the internally threaded portion.

5 Claims, 5 Drawing Sheets

(56)            References Cited

U.S. PATENT DOCUMENTS

| | | | | |
|---|---|---|---|---|
| 2014/0021384 A1* | 1/2014 | Kabel | ................... | F16K 31/047 |
| | | | | 251/129.01 |
| 2014/0034167 A1* | 2/2014 | Wodara | ................ | F16K 11/044 |
| | | | | 137/625.48 |
| 2021/0325919 A1* | 10/2021 | Hutchison | ............. | F16K 11/044 |
| 2023/0204110 A1* | 6/2023 | Sobka, Jr. | ............... | F16K 31/50 |
| 2024/0191741 A1* | 6/2024 | Pleuhs | ................. | F16B 21/071 |

* cited by examiner

Hot water                Water                Fuel gas

FIG. 4A
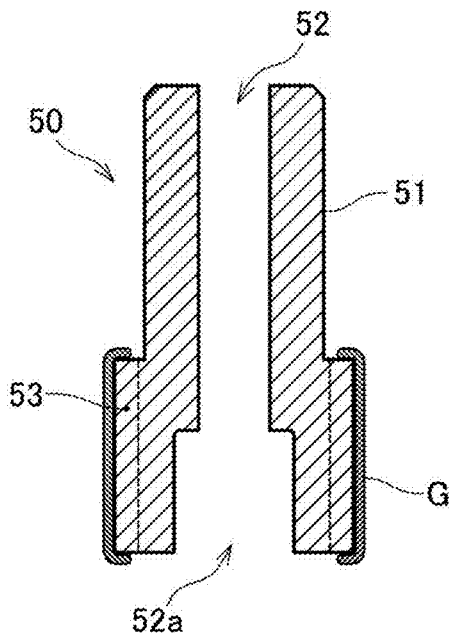
FIG. 4B
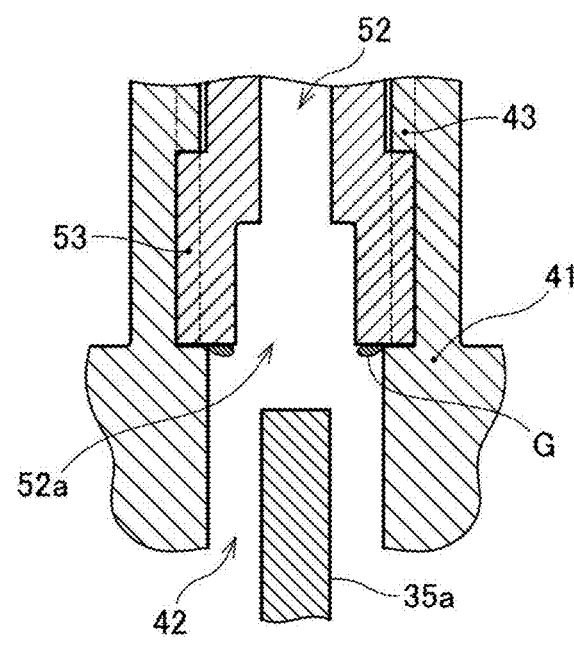
FIG. 4C
FIG. 4D
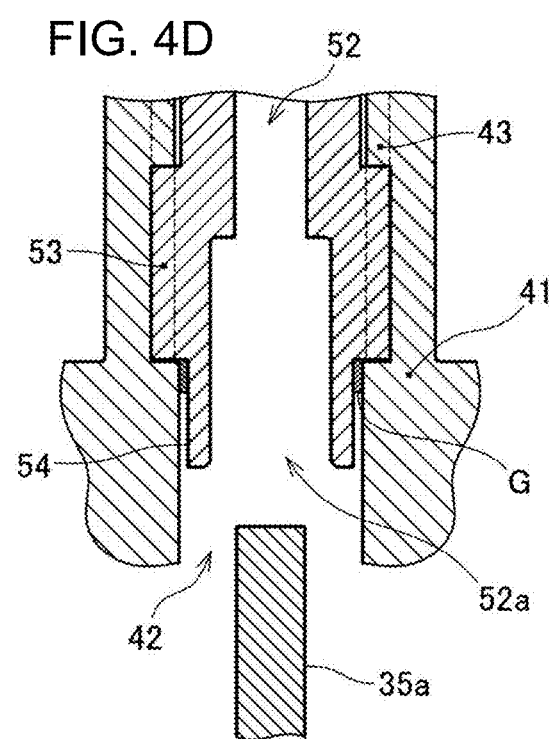

THREE-WAY VALVE

BACKGROUND OF INVENTION

Field of the Invention

The present invention relates to a three-way valve including a straight flow path having an end continuous with a first port, the other end continuous with a second port, and an intermediate portion continuous with a third port to change the amount of fluid flowing between the first port and the third port and the amount of fluid flowing between the second port and the third port.

Background Art

A three-way valve including three ports connected to pipes is common in, for example, a water heater. Such a valve may be a flow divider valve for dividing a flow of fluid (e.g., water) in a single pipe into two pipes at a changeable flow ratio between the two pipes, or a mixing valve for combining flows of fluid in two pipes into a single pipe at a changeable mixing ratio. For example, Patent Literature 1 describes a three-way valve used as a flow divider valve in a water heater. The valve includes a casing containing a straight flow path. The straight flow path has an end continuous with a first port, the other end continuous with a second port, and an intermediate portion continuous with a third port. The straight flow path includes a first valve orifice between the first port and the third port. The first valve orifice has an opening area changeable in response to a first valve element moving toward or away from the first valve orifice. Similarly, the straight flow path includes a second valve orifice between the second port and the third port. The second valve orifice has an opening area changeable in response to a second valve element moving toward or away from the second valve orifice. The first valve element and the second valve element are bonded to an end of a shaft that is drivable by a motor to move in the axial direction parallel to the straight flow path. The first valve element and the second valve element move along the straight flow path together with the shaft to change the amount of fluid flowing between the first port and the third port and the amount of fluid flowing between the second port and the third port.

The shaft is placed through a bearing in an inner member, or a guide, incorporated in the casing of the three-way valve. The shaft is supported by the bearing and is movable in the axial direction. The distal end of the shaft opposite to the first valve element and the second valve element is received inside a driver and bonded to the driver. The driver includes, on its outer peripheral surface, a gear to which a driving force is transmitted from the motor. The driver includes, on its outer peripheral surface, the gear adjacent to the upper end and includes an externally threaded portion with an external thread adjacent to the lower end, when the direction in which the valve elements are located with respect to the shaft is downward and the direction in which the driver is located with respect to the shaft is upward in the axial direction. The inner member includes, upward from the bearing, an internally threaded portion having an inner peripheral surface with an internal thread. The internally threaded portion corresponds to the externally threaded portion and receives the externally threaded portion. When the driver is driven by the motor and rotates about the axis of the shaft, the shaft moves in the axial direction together with the driver in response to the externally threaded portion being screwed into the internally threaded portion.

CITATION LIST

Patent Literature

Patent Literature 1: Japanese Unexamined Patent Application Publication No. 2014-62559

SUMMARY OF INVENTION

In the three-way valve with the above structure, grease is typically applied to the externally threaded portion on the driver during assembly to allow the externally threaded portion on the driver to be smoothly screwed into the internally threaded portion on the inner member. The grease may adhere to the end face of the driver adjacent to the external thread and may further adhere to the distal end of the shaft inserted into the driver. The grease placed between the driver and the shaft may decrease their bonding strength.

In response to the above issue with the known technique, one or more aspects of the present invention are directed to a three-way valve that can be assembled without a decrease in the bonding strength between a driver and a shaft caused by grease applied to an externally threaded portion on the driver adhering to the distal end of the shaft.

A three-way valve according to aspects of the present invention has the structure below.

First Aspect

The three-way valve includes a first port, a second port, a third port, a straight flow path, a shaft, a guide, and a driver. The straight flow path includes an end continuous with the first port, another end continuous with the second port, an intermediate portion continuous with the third port, a first valve orifice, and a second valve orifice. The first valve orifice is between the first port and the third port, and has an opening area changeable in response to a first valve element moving toward or away from the first valve orifice. The second valve orifice is between the second port and the third port, and has an opening area changeable in response to a second valve element moving toward or away from the second valve orifice. The shaft is drivable by a motor to move in an axial direction of the shaft parallel to the straight flow path. The shaft includes a first end at which the first valve element and the second valve element are located. The first valve element and the second valve element are movable along the straight flow path together with the shaft to change an amount of fluid flowing between the first port and the third port and an amount of fluid flowing between the second port and the third port. The guide includes a bearing through which the shaft is placed. The bearing supports the shaft to allow the shaft to move in the axial direction. The driver is cylindrical and includes, on an outer peripheral surface of the driver, a gear to which a driving force is transmitted from the motor. The driver has an insertion hole being open in an end face of the driver facing the first valve element and the second valve element. The insertion hole receives a second end of the shaft opposite to the first valve element and the second valve element. The driver is bonded to the second end of the shaft. Where a direction in which the driver is located with respect to the shaft in the axial direction is upward, and an opposite direction in which the first valve element and the second valve element are located with respect to the shaft in the axial direction is downward, the driver includes, downward from the gear, an externally threaded portion having an outer peripheral surface with an external thread, and the guide includes, upward from the bearing, an internally threaded portion having an inner peripheral surface with an internal thread. When the driver is driven by the motor and rotates about an axis of the shaft with the externally threaded portion placed in the internally threaded portion, the shaft moves in the axial direction in response to the externally threaded portion being screwed into the internally threaded portion. The driver includes a cylindrical portion protruding downward from a lower end face of the externally threaded portion. The cylindrical portion includes the insertion hole inside the cylindrical portion. The cylindrical portion has an outer diameter smaller than an inner diameter of the internally threaded portion.

The three-way valve according to the first aspect includes the cylindrical portion between the externally threaded portion on the outer peripheral surface of the driver and the lower end face (the end face facing the first valve element and the second valve element) of the driver in which the insertion hole is open. In this structure, the grease applied to the externally threaded portion is less likely to adhere to a portion around the insertion hole in the lower end face of the driver (cylindrical portion) than in a structure including no cylindrical portion. The grease is thus less likely to adhere to the distal end of the shaft inserted into the insertion hole in the driver. This can avoid a decrease in the bonding strength between the driver and the shaft caused by the grease.

Second Aspect

In the three-way valve according to the first aspect, the shaft includes a rotation locking portion having a rotation locking shape being a noncircle in a cross section perpendicular to the axial direction. The driver includes a fitting portion inside the cylindrical portion. The fitting portion is a part of the insertion hole. The fitting portion has a shape corresponding to the rotation locking shape to fit on the rotation locking portion. The rotation locking portion has an upper end located downward from an upper end of the internally threaded portion when the shaft placed through the bearing in the guide is at an uppermost position to which the shaft is movable in the axial direction. The cylindrical portion in the driver protrudes by a length allowing the fitting portion to fit on the rotation locking portion before the externally threaded portion is screwed into the internally threaded portion.

In the three-way valve according to the second aspect, the driver with the cylindrical portion placed inside the internally threaded portion can be rotated freely about the axis of the shaft to align the rotation locking portion and the fitting portion with each other for fitting them together, without the constraint of engagement between the externally threaded portion and the internally threaded portion. This structure is easier to assemble than a structure including no cylindrical portion.

Third Aspect

In the three-way valve according to the second aspect, the shaft has a groove on an outer peripheral surface of the shaft. The groove receives an O-ring sealing between the shaft and the bearing in the guide. The groove is located to have the O-ring downward from a lower end of the internally threaded portion with the upper end of the rotation locking portion located downward from the upper end of the internally threaded portion when the shaft placed through the bearing in the guide is at the uppermost position to which the shaft is movable in the axial direction.

In the three-way valve according to the third aspect, the O-ring fixed to the shaft eliminates a backup ring or a retaining ring for fixing the O-ring to the bearing in the guide. The three-way valve thus includes fewer components and is easier to assemble. Although the O-ring moves in the axial direction together with the shaft, the O-ring does not reach the internally threaded portion when the shaft is at the uppermost position to which the shaft is movable. The O-ring is thus free from damage caused by contact with the boundary between the bearing and the internally threaded portion or by contact with the internal thread.

BRIEF DESCRIPTION OF THE DRAWINGS

FIGS. 4A, 4B, 4C, and 4D are diagrams of a driver 50 including a cylindrical portion 54 and a driver 50 including no cylindrical portion 54, comparing the likelihood of grease adhering to the distal end of a small-diameter portion 35a of a shaft 35.

DETAILED DESCRIPTION

Figure 1:
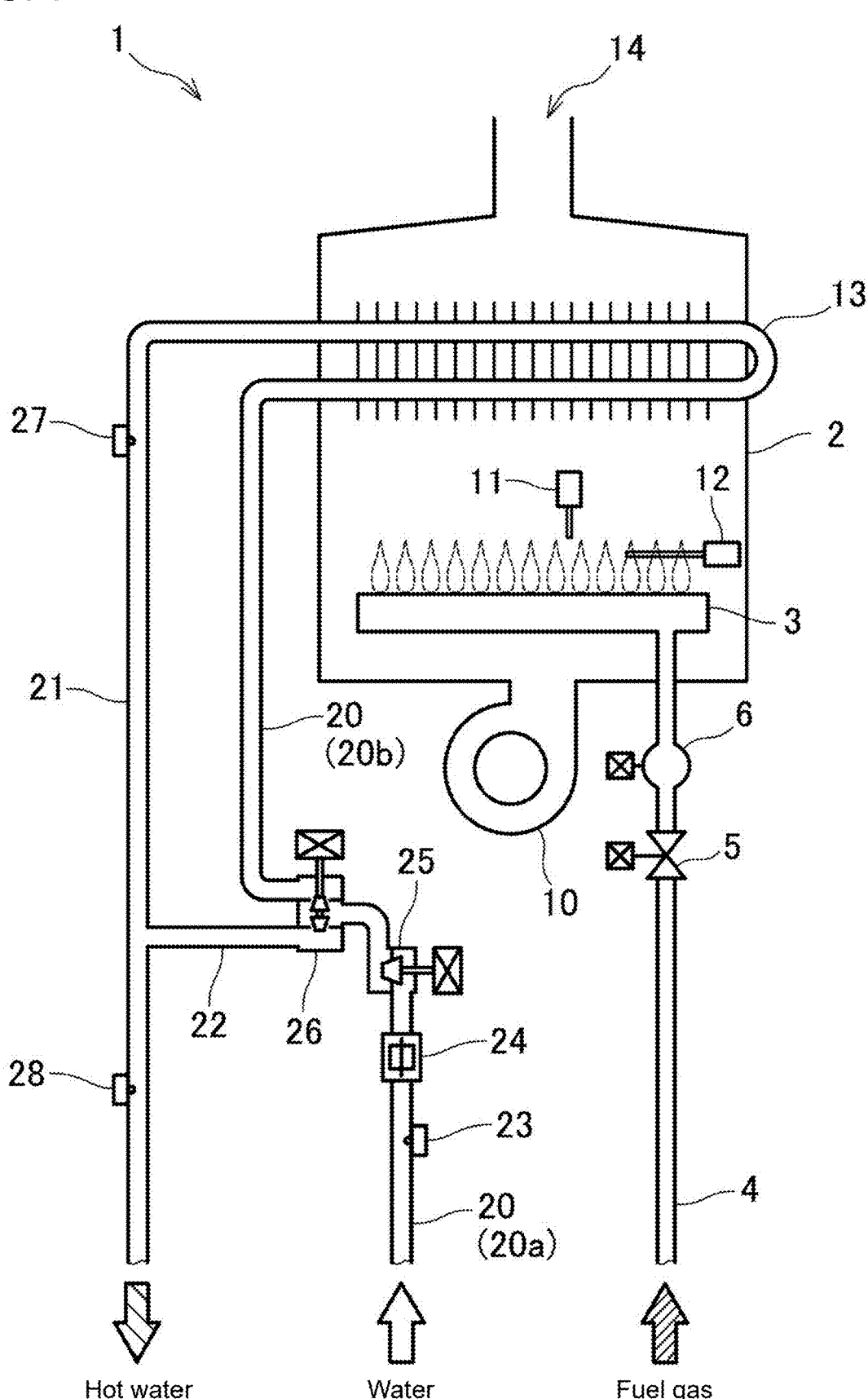
FIG. 1 is a diagram of a water heater 1 including a three-way valve 26 according to an embodiment, showing an example overall structure.

FIG. 1 is a diagram of a water heater 1 including a three-way valve 26 according to an embodiment, showing its overall structure. As illustrated, the water heater 1 includes a burner 3 in a combustion chamber 2 to burn fuel gas. The fuel gas is supplied through a gas pipe 4 including a main valve 5 that opens and closes the gas pipe 4 and a proportioning valve 6 that regulates the flow rate of fuel gas. The water heater 1 further includes a combustion fan 10 that supplies combustion air to the burner 3 from below, a spark plug 11 that ignites the burner 3 with a spark discharge, and a flame rod 12 that detects a flame (ignition) of the burner 3. The speed of the combustion fan 10 is controlled based on the degree of opening of the proportioning valve 6 to adjust the air-fuel ratio to a predetermined ratio.

The water heater 1 includes a heat exchanger 13 above the burner 3 and an exhaust port 14 at the top of the water heater 1. Exhaust gas generated by combustion in the burner 3 flows upward with the combustion fan 10 blowing and flows through the heat exchanger 13 and the exhaust port 14 to outside the water heater 1. The heat exchanger 13 has an upstream end connected to a water pipe 20 for supplying clean water, and a downstream end connected to a hot-water pipe 21. In the water heater 1 according to the present embodiment, the water pipe 20 is connected to the hot-water pipe 21 with a bypass pipe 22. A portion of the water pipe 20 upstream from the connection with the bypass pipe 22 may be referred to as an upstream water pipe 20a. A portion of the water pipe 20 downstream from the connection with the bypass pipe 22 may be referred to as a downstream water pipe 20b.

The upstream water pipe 20a includes a water temperature sensor 23 that detects the temperature of supplied clean water, a flow sensor 24 that detects the flow rate of clean water, and a water flow servo 25 that opens and closes the upstream water pipe 20a and controls the flow rate. These components are located in this order from upstream. The three-way valve 26 is located at the connection between the water pipe 20 and the bypass pipe 22. The three-way valve 26 according to the present embodiment is used as a flow divider valve for dividing a flow of clean water supplied to the water heater 1 into a flow to the heat exchanger 13 and a flow to the bypass pipe 22 without being through the heat exchanger 13. The three-way valve 26 can change the amount of water flowing into the heat exchanger 13 and the amount of water flowing into the bypass pipe 22. The details of the three-way valve 26 will be described later with reference to another figure.

The clean water supplied to the heat exchanger 13 is heated by heat exchange with exhaust gas from the burner 3 using the heat exchanger 13. The resulting hot water flows to the hot-water pipe 21. The hot water flowing to the hot-water pipe 21 mixes with the clean water passing through the bypass pipe 22 and is supplied to a bathtub or a hot water tap (not shown). The three-way valve 26 can change the mixing ratio between the water heated by the heat exchanger 13 and the clean water passing through the bypass pipe 22.

The hot-water pipe 21 includes a heated water temperature sensor 27 that detects the temperature of hot water immediately after flowing out of the heat exchanger 13, and an outlet water temperature sensor 28 that detects the temperature (outlet water temperature) of hot water after mixing with clean water downstream from the connection with the bypass pipe 22. The temperature detected by the outlet water temperature sensor 28 is lower than the temperature detected by the heated water temperature sensor 27. The three-way valve 26 regulates the mixing ratio between the water heated by the heat exchanger 13 and the clean water passing through the bypass pipe 22 to reduce fluctuations in the outlet water temperature (the temperature of hot water supplied to the bathtub or the hot water tap).

Figure 2:
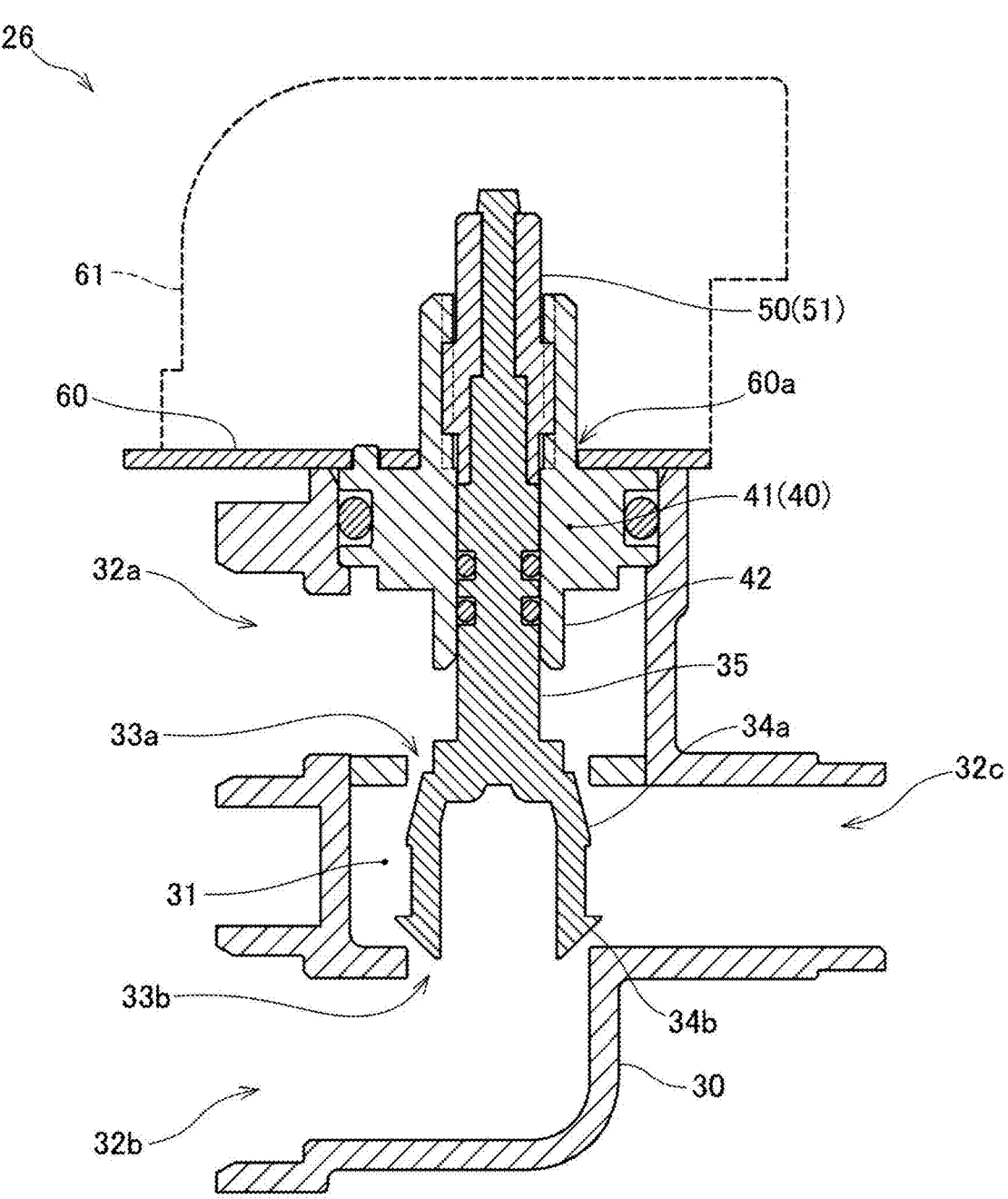
FIG. 2 is a cross-sectional view of the three-way valve 26 according to the present embodiment, showing its internal structure.

FIG. 2 is a cross-sectional view of the three-way valve 26 according to the present embodiment, showing its internal structure. As illustrated, the three-way valve 26 includes a casing 30 containing a straight flow path 31. The straight flow path 31 has an end continuous with a first port 32a, the other end continuous with a second port 32b, and an intermediate portion continuous with a third port 32c. In the water heater 1 according to the present embodiment, the first port 32a is connected to the downstream water pipe 20b, the second port 32b is connected to the bypass pipe 22, and the third port 32c is connected to the upstream water pipe 20a (refer to FIG. 1).

The straight flow path 31 includes a substantially circular first valve orifice 33a between the first port 32a and the third port 32c. The first valve orifice 33a has an opening area changeable in response to a first valve element 34a moving toward or away from the first valve orifice 33a. The first valve element 34a is tapered toward the first valve orifice 33a. Similarly, the straight flow path 31 includes a substantially circular second valve orifice 33b between the second port 32b and the third port 32c. The second valve orifice 33b has an opening area changeable in response to a second valve element 34b moving toward or away from the second valve orifice 33b. The second valve element 34b is tapered toward the second valve orifice 33b. The first valve element 34a and the second valve element 34b are located at an end of a shaft 35. The shaft 35 is drivable by a motor (not shown) to move in the axial direction parallel to the straight flow path 31. In the example described below, as shown in FIG.

2, the shaft 35 is oriented with its axial direction aligned with the up-down direction (vertical direction). The direction in which the first valve element 34a and the second valve element 34b are located is downward, and the opposite direction is upward. However, the three-way valve 26 may be oriented differently and may be used with the axial direction of the shaft 35 aligned with the horizontal direction.

The first valve element 34a and the second valve element 34b moving along the straight flow path 31 together with the shaft 35 can change the amount of fluid (water in the present embodiment) flowing between the first port 32a and the third port 32c and the amount of fluid flowing between the second port 32b and the third port 32c. When the shaft 35 moves upward, for example, the first valve element 34a moves toward the first valve orifice 33a and decreases the opening area of the first valve orifice 33a, thus decreasing the amount of water flowing between the first port 32a and the third port 32c. At the same time, the second valve element 34b moves away from the second valve orifice 33b and increases the opening area of the second valve orifice 33b, thus increasing the amount of water flowing between the second port 32b and the third port 32c. In contrast, when the shaft 35 moves downward, the first valve element 34a moves away from the first valve orifice 33a and increases the opening area of the first valve orifice 33a, thus increasing the amount of water flowing between the first port 32a and the third port 32c. At the same time, the second valve element 34b moves toward the second valve orifice 33b and decreases the opening area of the second valve orifice 33b, thus decreasing the amount of water flowing between the second port 32b and the third port 32c.

The casing 30 incorporates, in its upper portion, an inner member 40 with a guide 41 (described later). The shaft 35 is placed through a bearing 42 in the guide 41. The shaft 35 is supported by the bearing 42 and is movable in the axial direction (the up-down direction in the figure). The distal end (the upper end in the figure) of the shaft 35 opposite to the first valve element 34a and the second valve element 34b is received inside a cylindrical driver 50 and bonded to the driver 50 by heat welding. The driver 50 includes, on its outer peripheral surface, a gear 51 (described later) to which a driving force is transmitted from the motor.

As illustrated, a cover plate 60 covers an upper portion of the casing 30 incorporating the inner member 40. The cover plate 60 has a through-hole 60a through which an upper portion of the guide 41 protrudes upward. A motor case 61 is mounted above the cover plate 60. The motor case 61 accommodates the motor and a device (not shown) that transmits a driving force from the motor. The motor case 61 also accommodates the driver 50 bonded to the distal end of the shaft 35.

Figure 3:
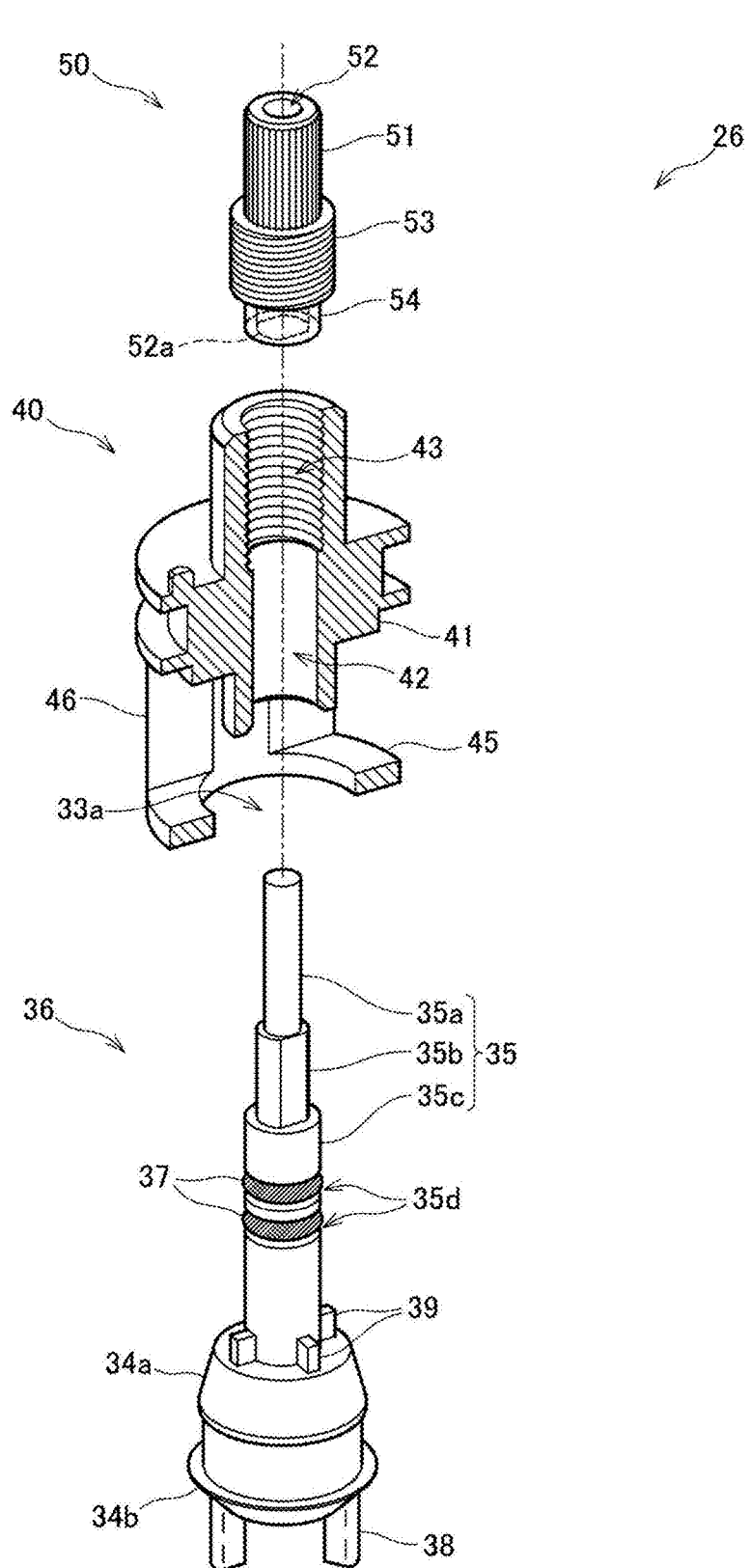
FIG. 3 is an exploded perspective view of the three-way valve 26 according to the present embodiment.

FIG. 3 is an exploded perspective view of the three-way valve 26 according to the present embodiment. FIG. 3 does not show the casing 30, the cover plate 60, or the motor case 61. In the three-way valve 26 according to the present embodiment, the first valve element 34a, the second valve element 34b, and the shaft 35 are an integral piece as a shaft valve element 36. The first valve element 34a and the second valve element 34b are located at an end (the lower end in the figure) of the shaft 35, as described above.

As illustrated, the shaft 35 has a nonuniform diameter and includes three portions with different diameters, or specifically, a small-diameter portion 35a, a medium-diameter portion 35b, and a large-diameter portion 35c. The small-diameter portion 35a with the smallest diameter is at the top and bonded to the driver 50. The large-diameter portion 35c with the largest diameter is at the bottom and includes the valve elements 34a and 34b. The medium-diameter portion 35b with a medium diameter is located between the small-diameter portion 35a and the large-diameter portion 35c. The small-diameter portion 35a and the large-diameter portion 35c are substantially circular in a cross section perpendicular to the axial direction of the shaft 35, whereas the medium-diameter portion 35b has a rotation locking shape being a noncircle in a cross section. In the present embodiment, the rotation locking shape is an I shape, which is the shape of a cylinder with its cylindrical surface cut away, in the axial direction, along two planes parallel to each other. The rotation locking shape of the medium-diameter portion 35b is not limited to the I shape and may be a D shape, which is the shape of a cylinder with its cylindrical surface cut away, in the axial direction, along a single plane. The medium-diameter portion 35b in the present embodiment corresponds to a rotation locking portion in one or more aspects of the present invention.

The large-diameter portion 35c has, on its outer peripheral surface, two grooves 35d to receive O-rings 37. The grooves 35d extend in the circumferential direction and are spaced from each other in the axial direction. The O-rings 37 can seal between the outer peripheral surface of the large-diameter portion 35c and the inner peripheral surface of the bearing 42 when the shaft 35 is placed through the bearing 42 in the guide 41.

The shaft valve element 36 in the present embodiment further includes multiple (three in the present embodiment) guiding portions 38 protruding downward (opposite to the driver 50) from the second valve element 34b. The guiding portions 38 are substantially equally spaced in the circumferential direction. The multiple guiding portions 38 are placed through the second valve orifice 33b to reduce wobbles of the shaft valve element 36 with respect to the axial direction of the shaft 35. This allows more accurate movement of the first valve element 34a and the second valve element 34b.

The shaft valve element 36 in the present embodiment includes multiple (four in the present embodiment) protrusions 39 protruding upward (toward the driver 50) from the first valve element 34a. The protrusions 39 are substantially equally spaced on the peripheral surface of the large-diameter portion 35c. As described later, the multiple protrusions 39 come in contact with the lower end (the end facing the first valve element 34a) of the bearing 42 in the guide 41 and define the uppermost position to which the shaft 35 is movable in the axial direction (the limit of movement toward the driver 50).

The inner member 40 in the present embodiment is an integral piece including the guide 41 with the bearing 42, a valve seat 45 with the first valve orifice 33a, and a connection portion 46 between the guide 41 and the valve seat 45. FIG. 3 shows the inner member 40 cutaway along a plane including the centerline of the bearing 42, allowing the inside of the bearing 42 to be visible. The shaft 35 in the shaft valve element 36 is placed through the first valve orifice 33a in the valve seat 45 and through the bearing 42 in the guide 41.

The bearing 42 is substantially cylindrical. The O-rings 37 seal between the outer peripheral surface of the large-diameter portion 35c and the inner peripheral surface of the bearing 42 when the shaft 35 is placed through the bearing 42 as described above. In other words, the O-rings 37 received in the grooves 35d on the outer peripheral surface of the large-diameter portion 35c move inside the bearing 42 together with the shaft 35. The O-rings 37 fixed to the shaft 35 in this manner eliminate a backup ring or a retaining ring for fixing the O-rings 37 to the bearing 42 in the guide 41. The three-way valve 26 thus includes fewer components and is easier to assemble.

As described above, the protrusions 39 on the shaft valve element 36 come in contact with the lower end of the bearing 42 to restrict upward movement of the shaft valve element 36. As illustrated, the guide 41 includes an internally threaded portion 43 upward from the bearing 42 (in a portion facing the driver 50). The internally threaded portion 43 has an inner peripheral surface with an internal thread.

The driver 50 in the present embodiment is cylindrical and includes, on its outer peripheral surface, the gear 51 to which a driving force is transmitted from the motor. The driver 50 has an insertion hole 52 inside the driver 50 to receive the small-diameter portion 35a of the shaft 35. The insertion hole 52 includes a fitting portion 52a adjacent to its lower end (the end facing the first valve element 34a). The fitting portion 52a has a shape corresponding to the rotation locking shape of the medium-diameter portion 35b to fit on the medium-diameter portion 35b. The fitting portion 52a fitting on the medium-diameter portion 35b locks rotation of the driver 50 relative to the shaft 35. The insertion hole 52 includes a portion adjacent to its upper end with a substantially circular shape corresponding to the shape of the small-diameter portion 35a in a cross section perpendicular to the axial direction. The insertion hole 52 in the present embodiment extends in the up-down direction through the driver 50. The shaft 35 is received in the insertion hole 52 through the fitting portion 52a, with the distal end of the small-diameter portion 35a protruding from the end of the insertion hole 52 opposite to the fitting portion 52a. In this state, the shaft 35 and the driver 50 are bonded together by heat welding using infrared rays.

The driver 50 also includes, on its outer peripheral surface, an externally threaded portion 53 having an external thread downward from the gear 51. The externally threaded portion 53 corresponds to the internally threaded portion 43 on the guide 41. The driver 50 further includes a cylindrical portion 54 protruding downward from the lower end face of the externally threaded portion 53. The cylindrical portion 54 has an outer diameter smaller than the inner diameter of the internally threaded portion 43. The cylindrical portion 54 includes, inside the cylindrical portion 54, the fitting portion 52a as a part of the insertion hole 52.

The driver 50 is driven by the motor and rotates about the axis of the shaft 35, with the externally threaded portion 53 on the driver 50 placed in the internally threaded portion 43 on the guide 41. The shaft 35 thus moves in the axial direction together with the driver 50 relative to the guide 41 in response to the externally threaded portion 53 being screwed into the internally threaded portion 43.

In the three-way valve 26 described above, grease is typically applied to the externally threaded portion 53 on the driver 50 during assembly to allow the externally threaded portion 53 on the driver 50 to be smoothly screwed into the internally threaded portion 43 on the guide 41. The grease may adhere to the distal end of the small-diameter portion 35a of the shaft 35 inserted into the insertion hole 52 in the driver 50. The grease placed between the driver 50 and the shaft 35 may decrease their bonding strength. In the three-way valve 26 according to the present embodiment, the driver 50 including the cylindrical portion 54 reduces the likelihood that the grease applied to the externally threaded portion 53 on the driver 50 adheres to the distal end of the small-diameter portion 35a of the shaft 35. This effect will now be described using a driver 50 including no cylindrical portion 54 for comparison.

FIGS. 4A to 4D are diagrams of the driver 50 including the cylindrical portion 54 and the driver 50 including no cylindrical portion 54, comparing the likelihood of grease adhering to the distal end of the small-diameter portion 35a of the shaft 35. FIGS. 4A to 4D each show a cross section of the driver 50 and other components taken along a plane including the centerline of the insertion hole 52. FIGS. 4A and 4B show the driver 50 including no cylindrical portion 54. As shown in FIG. 4A, grease G applied to the externally threaded portion 53 on the driver 50 may overflow from the outer peripheral surface of the externally threaded portion 53 to the lower end face of the driver 50 (the end face facing the first valve element 34a). With the lower end face having the insertion hole 52 (fitting portion 52a), the grease G may adhere to a portion around the insertion hole 52.

As shown in FIG. 4B in an enlarged manner, when the externally threaded portion 53 on the driver 50 with the grease G is screwed into and reaches the bottom of the internally threaded portion 43 on the guide 41, the grease G overflows from between the externally threaded portion 53 and the internally threaded portion 43 and is squeezed out on the lower end face of the driver 50. The grease G adheres to the portion around the insertion hole 52 (fitting portion 52a) that is open in the same lower end face. The grease G on the portion around the insertion hole 52 may adhere to the distal end of the small-diameter portion 35a of the shaft 35 inserted into the insertion hole 52 in the driver 50 after being inserted through the bearing 42 in the guide 41.

FIGS. 4C and 4D show the driver 50 including the cylindrical portion 54. As shown in FIG. 4C, the grease G applied to the externally threaded portion 53 on the driver 50 may overflow from the outer peripheral surface of the externally threaded portion 53. However, with the cylindrical portion 54 protruding downward from the lower end of the externally threaded portion 53, the grease G is less likely to adhere to the lower end face (the end face facing the first valve element 34a) of the cylindrical portion 54 in which the insertion hole 52 (fitting portion 52a) is open, although grease G may adhere to the outer peripheral surface of the cylindrical portion 54.

As shown in FIG. 4D in an enlarged manner, when the externally threaded portion 53 on the driver 50 with the grease G is screwed into the bottom of the internally threaded portion 43 on the guide 41, the grease G may overflow from between the externally threaded portion 53 and the internally threaded portion 43. However, the overflow of the grease G is limited to the space between the outer peripheral surface of the cylindrical portion 54 and the inner peripheral surface of the bearing 42. The grease G is thus less likely to adhere to the lower end face of the cylindrical portion 54 in which the insertion hole 52 (fitting portion 52a) is open.

In the driver 50 including the cylindrical portion 54, the grease G applied to the externally threaded portion 53 on the driver 50 is less likely to adhere to the portion around the insertion hole 52 (fitting portion 52a) that is open in the lower end face of the driver 50 (cylindrical portion 54) than in the driver 50 including no cylindrical portion 54. The grease G is thus less likely to adhere to the distal end of the small-diameter portion 35a of the shaft 35 inserted into the insertion hole 52 in the driver 50. This can avoid a decrease in the bonding strength between the driver 50 and the shaft 35 caused by the grease G.

In the example shown in FIGS. 4A to 4D, the externally threaded portion 53 on the driver 50 is screwed into the internally threaded portion 43 on the guide 41, and then the small-diameter portion 35a of the shaft 35 is inserted through the bearing 42 in the guide 41 and into the insertion hole 52 in the driver 50. However, the three-way valve 26 according to the present embodiment may be assembled in a different sequence. For example, the shaft 35 in the shaft valve element 36 may be inserted through the bearing 42 in the guide 41, and then the externally threaded portion 53 may be screwed into the internally threaded portion 43 on the guide 41 while the small-diameter portion 35a of the shaft 35 is being inserted into the insertion hole 52 in the driver 50. In this case, the three-way valve 26 including the cylindrical portion 54 in the driver 50 is easier to assemble, in addition to reducing the likelihood that the grease G applied to the externally threaded portion 53 on the driver 50 adheres to the distal end of the small-diameter portion 35a of the shaft 35 as described above. This effect will now be described.

Figure 5A:
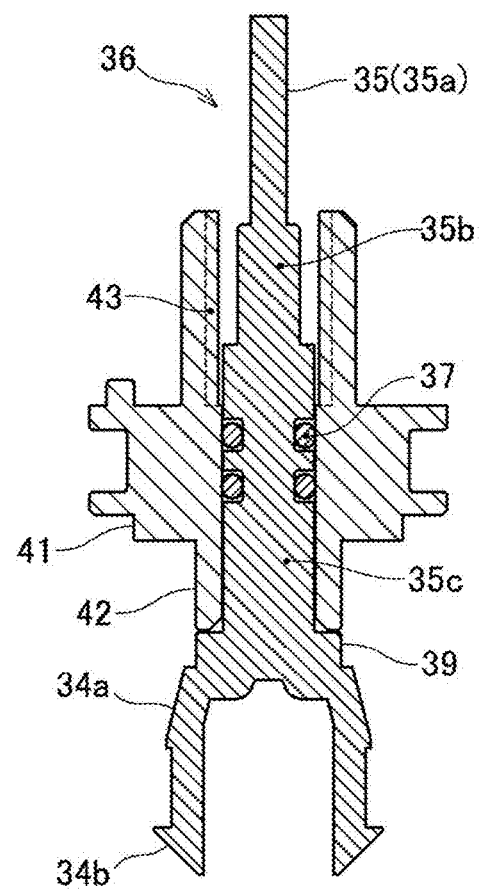
FIGS. 5A, 5B, and 5C are diagrams describing an assembly sequence of the three-way valve 26 in which the shaft 35 in a shaft valve element 36 is inserted through a bearing 42 in a guide 41, and then an externally threaded portion 53 on the driver 50 is screwed into an internally threaded portion 43 on the guide 41.
Figure 5B:
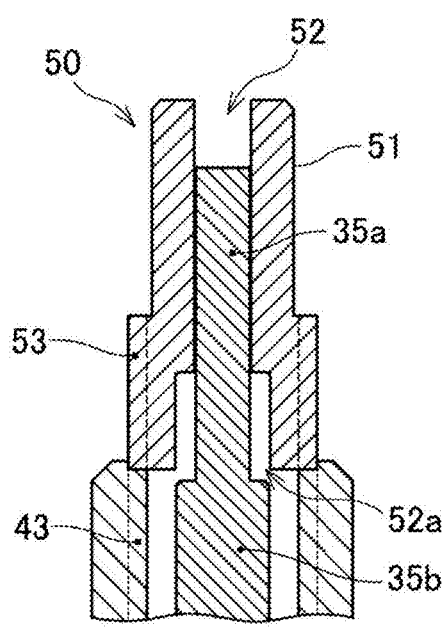
Figure 5C:
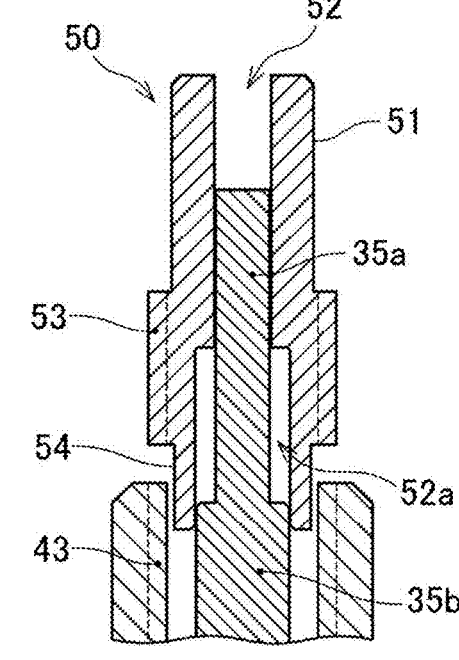

FIGS. 5A to 5C are diagrams describing an assembly sequence of the three-way valve 26 in which the shaft 35 in the shaft valve element 36 is inserted through the bearing 42 in the guide 41, and then the externally threaded portion 53 on the driver 50 is screwed into the internally threaded portion 43 on the guide 41. FIGS. 5A to 5C each show a cross section of the shaft valve element 36 and other components taken along a plane including the centerline of the shaft 35. FIG. 5A shows the shaft 35 in the shaft valve element 36 placed through the bearing 42 in the guide 41.

As described above, the shaft valve element 36 in the present embodiment includes the protrusions 39 that come in contact with the lower end (the end facing the first valve element 34a) of the bearing 42 and define the uppermost position to which the shaft 35 is movable in the axial direction (the limit of movement toward the driver 50). The grooves 35d (refer to FIG. 3) receiving the O-rings 37 are located to have the O-rings 37 downward from the lower end of the internally threaded portion 43 when the shaft valve element 36 is at the uppermost position to which the shaft valve element 36 is movable. Although the O-rings 37 move in the axial direction together with the shaft 35, the O-rings 37 do not reach the internally threaded portion 43. The O-rings 37 are thus free from damage caused by contact with the boundary between the bearing 42 and the internally threaded portion 43 or by contact with the internal thread.

In the shaft valve element 36 in the present embodiment, when the shaft 35 is at the uppermost position to which the shaft 35 is movable in the axial direction, the small-diameter portion 35a at the top protrudes upward from the internally threaded portion 43, whereas the upper end of the medium-diameter portion 35b is located downward from the upper end of the internally threaded portion 43 (inside the internally threaded portion 43) without protruding upward from the internally threaded portion 43, as shown in FIG. 5A. To join the driver 50, the externally threaded portion 53 is screwed into the internally threaded portion 43 on the guide 41 while the small-diameter portion 35a of the shaft 35 protruding from the internally threaded portion 43 is being inserted into the insertion hole 52 in the driver 50.

In the driver 50 including no cylindrical portion 54, the grease G on the portion around the insertion hole 52 (fitting portion 52a) that is open in the lower end face of the driver 50 may adhere to the distal end of the small-diameter portion 35a, as described above (refer to FIG. 4A). Further, as shown in FIG. 5B, the medium-diameter portion 35b having the rotation locking shape is fitted into the fitting portion 52a after the externally threaded portion 53 on the driver 50 starts being screwed into the internally threaded portion 43 on the guide. In other words, the medium-diameter portion 35*b* is to be aligned with the fitting portion 52*a* for their fitting under the constraint of engagement between the externally threaded portion 53 and the internally threaded portion 43. This complicates the assembly.

In contrast, in the driver 50 including the cylindrical portion 54, the grease G applied to the externally threaded portion 53 is less likely to adhere to the portion around the insertion hole 52 (fitting portion 52*a*) that is open in the lower end face of the driver 50 (cylindrical portion 54), as described above (refer to FIG. 4C). The grease G is thus less likely to adhere to the distal end of the small-diameter portion 35*a*. Further, as shown in FIG. 5C, the cylindrical portion 54 in the driver 50 in the present embodiment protrudes by a length that allows the fitting portion 52*a* inside the cylindrical portion 54 to fit on the medium-diameter portion 35*b* before the externally threaded portion 53 on the driver 50 is screwed into the internally threaded portion 43 on the guide. The driver 50 with the cylindrical portion 54 placed inside the internally threaded portion 43 can thus be rotated freely about the axis of the shaft 35 to align the medium-diameter portion 35*b* and the fitting portion 52*a* with each other for fitting them together, without the constraint of engagement between the externally threaded portion 53 and the internally threaded portion 43. This structure is easier to assemble.

The three-way valve 26 according to the present embodiment has been described. However, the present invention is not limited to the above embodiment and may be implemented in various manners without departing from the spirit and scope of the invention.

For example, in the above embodiment, the three-way valve 26 is used as a flow divider valve in the water heater 1. However, the three-way valve 26 is not limited to a flow divider valve and may be used as a mixing valve for combining a flow of water heated by the heat exchanger 13 and a flow of clean water passing through the bypass pipe 22. In this case, the first port 32*a* may be connected to a portion of the hot-water pipe 21 upstream from the connection with the bypass pipe 22 (nearer the heat exchanger 13), the second port 32*b* may be connected to the bypass pipe 22, and the third port 32*c* may be connected to a portion of the hot-water pipe 21 downstream from the connection with the bypass pipe 22 (nearer the hot water tap). The three-way valve 26 may be used as a flow divider valve or a mixing valve to control any of various fluids, rather than being used in the water heater 1.

In the above embodiment, the shaft 35 and the driver 50 are bonded together by heat welding with the small-diameter portion 35*a* placed in the insertion hole 52. However, the shaft 35 and the driver 50 may be bonded together with a method other than heat welding, such as press-fitting the shaft 35 into the insertion hole 52 or using adhesive. When such press-fitting or adhesive is used to bond the shaft 35 and the driver 50, the insertion hole 52 may not extend through the driver 50 to the upper end, unlike the insertion hole 52 in the above embodiment extending in the up-down direction (the axial direction of the shaft 35) through the driver 50. For bonding with press-fitting or adhesive as well, any grease G adhering to the distal end of the shaft 35 may prevent proper bonding between the shaft 35 and the driver 50. Thus, the structure according to one or more aspects of the present invention can avoid a decrease in the bonding strength.

In the above embodiment, the shaft 35, the first valve element 34*a*, and the second valve element 34*b* are an integral piece as the shaft valve element 36. In some embodiments, the shaft 35, the first valve element 34*a*, and the second valve element 34*b* may be separate pieces that are bonded together to serve as the shaft valve element 36, rather than being an integral piece. However, the shaft 35, the first valve element 34*a*, and the second valve element 34*b* being an integral piece as the shaft valve element 36 in the above embodiment can eliminate, for example, a stop ring or a push nut for bonding separate such components. The three-way valve 26 thus includes fewer components and is easier to assemble.

In the above embodiment, the protrusions 39 are included in the shaft valve element 36 to define the uppermost position to which the shaft valve element 36 (shaft 35) is movable in the axial direction. In some embodiments, the guide 41 may include multiple protrusions protruding downward from the lower end of the bearing 42 and substantially equally spaced in the circumferential direction. The protrusions may come in contact with the first valve element 34*a* to define the uppermost position to which the shaft valve element 36 is movable.

REFERENCE SIGNS LIST

1 water heater
2 combustion chamber
3 burner
4 gas pipe
5 main valve
6 proportioning valve
10 combustion fan
11 spark plug
12 flame rod
13 heat exchanger
14 exhaust port
20 water pipe
21 hot-water pipe
22 bypass pipe
23 water temperature sensor
24 flow sensor
25 water flow servo
26 three-way valve
27 heated water temperature sensor
28 outlet water temperature sensor
30 casing
31 straight flow path
32*a* first port
32*b* second port
32*c* third port
33*a* first valve orifice
33*b* second valve orifice
34*a* first valve element
34*b* second valve element
35 shaft
35*a* small-diameter portion
35*b* medium-diameter portion
35*c* large-diameter portion
35*d* groove
36 shaft valve element
37 O-ring
38 guiding portion
39 protrusion
40 inner member
41 guide
42 bearing 43 internally threaded portion
45 valve seat
46 connection portion
50 driver
51 gear
52 insertion hole
52a fitting portion
53 externally threaded portion
54 cylindrical portion
60 cover plate
60a through-hole
61 motor case

The invention claimed is:

1. A three-way valve, comprising:

a first port, a second port, and a third port;

a straight flow path including
    an end continuous with the first port,
    another end continuous with the second port,
    an intermediate portion continuous with the third port,
    a first valve orifice between the first port and the third port, the first valve orifice having an opening area changeable in response to a first valve element moving toward or away from the first valve orifice, and
    a second valve orifice between the second port and the third port, the second valve orifice having an opening area changeable in response to a second valve element moving toward or away from the second valve orifice;

a shaft drivable by a motor to move in an axial direction of the shaft parallel to the straight flow path, the shaft including a first end at which the first valve element and the second valve element are located, the first valve element and the second valve element being movable along the straight flow path together with the shaft to change an amount of fluid flowing between the first port and the third port and an amount of fluid flowing between the second port and the third port;

a guide including a bearing through which the shaft is placed, the bearing supporting the shaft to allow the shaft to move in the axial direction; and a driver being cylindrical and including, on an outer peripheral surface of the driver, a gear to which a driving force is transmitted from the motor, the driver having an insertion hole being open in an end face of the driver facing the first valve element and the second valve element, the insertion hole receiving a second end of the shaft opposite to the first valve element and the second valve element, the driver being bonded to the second end of the shaft, wherein where a direction in which the driver is located with respect to the shaft in the axial direction is upward, and an opposite direction in which the first valve element and the second valve element are located with respect to the shaft in the axial direction is downward, the driver includes, downward from the gear, an externally threaded portion having an outer peripheral surface with an external thread, and the guide includes, upward from the bearing, an internally threaded portion having an inner peripheral surface with an internal thread, when the driver is driven by the motor and rotates about an axis of the shaft with the externally threaded portion placed in the internally threaded portion, the shaft moves in the axial direction in response to the externally threaded portion being screwed into the internally threaded portion, the driver includes a cylindrical portion integrally protruding downward from a lower end face of the externally threaded portion, the cylindrical portion includes the insertion hole inside the cylindrical portion, and the cylindrical portion has an outer diameter smaller than a minimum outer diameter of the externally threaded portion, and the shaft is fixedly bonded to the driver.

2. The three-way valve according to claim 1, wherein the shaft includes a rotation locking portion having a rotation locking shape being a noncircle in a cross section perpendicular to the axial direction, the driver includes a fitting portion inside the cylindrical portion, the fitting portion is a part of the insertion hole, and the fitting portion has a shape corresponding to the rotation locking shape to fit on the rotation locking portion, the rotation locking portion has an upper end located downward from an upper end of the internally threaded portion when the shaft placed through the bearing in the guide is at an uppermost position to which the shaft is movable in the axial direction, and the cylindrical portion in the driver protrudes by a length allowing the fitting portion to fit on the rotation locking portion before the externally threaded portion is screwed into the internally threaded portion.

3. The three-way valve according to claim 2, wherein the shaft has a groove on an outer peripheral surface of the shaft, and the groove receives an O-ring sealing between the shaft and the bearing in the guide, and the groove is located to have the O-ring downward from a lower end of the internally threaded portion with the upper end of the rotation locking portion located downward from the upper end of the internally threaded portion when the shaft placed through the bearing in the guide is at the uppermost position to which the shaft is movable in the axial direction.

4. A three-way valve, comprising:

a first port, a second port, and a third port;

a straight flow path including
    an end continuous with the first port,
    another end continuous with the second port,
    an intermediate portion continuous with the third port,
    a first valve orifice between the first port and the third port, the first valve orifice having an opening area changeable in response to a first valve element moving toward or away from the first valve orifice, and
    a second valve orifice between the second port and the third port, the second valve orifice having an opening area changeable in response to a second valve element moving toward or away from the second valve orifice;

a shaft drivable by a motor to move in an axial direction of the shaft parallel to the straight flow path, the shaft including a first end at which the first valve element and the second valve element are located, the first valve element and the second valve element being movable along the straight flow path together with the shaft to change an amount of fluid flowing between the first port and the third port and an amount of fluid flowing between the second port and the third port;

a guide including a bearing through which the shaft is placed, the bearing supporting the shaft to allow the shaft to move in the axial direction; and a driver being cylindrical and including, on an outer peripheral surface of the driver, a gear to which a driving force is transmitted from the motor, the driver having an insertion hole being open in an end face of the driver facing the first valve element and the second valve element, the insertion hole receiving a second end of the shaft opposite to the first valve element and the second valve element, the driver being bonded to the second end of the shaft, wherein where a direction in which the driver is located with respect to the shaft in the axial direction is upward, and an opposite direction in which the first valve element and the second valve element are located with respect to the shaft in the axial direction is downward, the driver includes, downward from the gear, an externally threaded portion having an outer peripheral surface with an external thread, and the guide includes, upward from the bearing, an internally threaded portion having an inner peripheral surface with an internal thread, when the driver is driven by the motor and rotates about an axis of the shaft with the externally threaded portion placed in the internally threaded portion, the shaft moves in the axial direction in response to the externally threaded portion being screwed into the internally threaded portion, the driver includes a cylindrical portion protruding downward from a lower end face of the externally threaded portion, the cylindrical portion includes the insertion hole inside the cylindrical portion, and the cylindrical portion has an outer diameter smaller than an inner diameter of the internally threaded portion, the shaft includes a rotation locking portion having a rotation locking shape being a noncircle in a cross section perpendicular to the axial direction, the driver includes a fitting portion inside the cylindrical portion, the fitting portion is a part of the insertion hole, and the fitting portion has a shape corresponding to the rotation locking shape to fit on the rotation locking portion, the rotation locking portion has an upper end located downward from an upper end of the internally threaded portion when the shaft placed through the bearing in the guide is at an uppermost position to which the shaft is movable in the axial direction, and the cylindrical portion in the driver protrudes by a length allowing the fitting portion to fit on the rotation locking portion before the externally threaded portion is screwed into the internally threaded portion.

5. The three-way valve according to claim 4, wherein the shaft has a groove on an outer peripheral surface of the shaft, and the groove receives an O-ring sealing between the shaft and the bearing in the guide, and the groove is located to have the O-ring downward from a lower end of the internally threaded portion with the upper end of the rotation locking portion located downward from the upper end of the internally threaded portion when the shaft placed through the bearing in the guide is at the uppermost position to which the shaft is movable in the axial direction.

* * * * *